Patented Apr. 28, 1936

2,038,632

UNITED STATES PATENT OFFICE 2,038,632

GASOLINE AND METHOD OF MAKING THE SAME

Harry T. Bennett, Tulsa, Okla., and Le Roy G. Story, Beacon, N. Y., assignors, by mesne assignments, to Gasoline Antioxidant Company, Wilmington, Del., a corporation of Delaware No Drawing. Original application January 16, 1928, Serial No. 247,256. Divided and this application October 9, 1933, Serial No. 692,900

17 Claims. (Cl. 44—9)

This invention relates to gasoline and more specifically to cracked gasoline.

An important object of the invention is to produce a cracked gasoline which will not deposit a residue of gum when vaporized. This is accomplished by treating fresh cracked gasoline so that it will neither deposit appreciable amounts of gum when immediately evaporated nor accumulate said gum in solution when standing in storage for long periods before consumption.

A further object is to preserve the anti-knock quality of the cracked gasoline or, in other words, to prevent the formation of soluble detonating compounds, said compounds being closely related to the gum and coloring constituents.

With the foregoing objects in view, we will proceed to point out some of the undesirable characteristics of cracked gasoline, how our invention overcomes these undesirable characteristics, and finally compare our methods with those previously used and point out the advantages of the methods we have discovered.

Cracked gasolines have the property, even when freshly made, of depositing dark brown gummy residues on surfaces from which they are slowly evaporated. The composition of the deposit is not fully understood but has become known in the trade as gum and will hereafter be referred to by this term. The chemical reaction producing the gum is also not fully understood, but we believe it is an oxidation reaction either internal or external; internal oxidation being that taking place within the material, itself, and external that caused by some external power as oxygen from the air or the rays of light.

Another property commonly noted in gasolines made from cracked products is formation of gum in solutions which is evidenced by an increase in the deposit left by evaporating a sample that has stood for some time in comparison with that formed by the original material before aging. The compounds which have the power then of producing gum when the fresh sample is evaporated apparently proceed to form gum in solution when the same product is allowed to stand.

A further property also related to gum is the detonation characteristic. It is related in that a gasoline which has accumulated appreciable quantities of gum in solution also shows a greater tendency to knock. In other words, the gum which causes a darkening in color and also produces a non-volatile deposit, apparently is composed of compounds which cause knocking in the internal combustion engine. It is important to prevent the formation of compounds which promote detonation in cracked fuels because it is by virtue of the cracked or unsaturated nature of these fuels that they have become recognized as anti-knock gasolines.

Our invention overcomes the above mentioned color gum and detonation problems by inhibiting the reactions which produce gum either when the fresh sample is evaporated or when the same product is allowed to age before evaporation.

The invention which we will hereafter describe is concerned with the prevention of the reactions which cause formation of gum rather than the remedy after the harm or effect has been caused, for we have found that once the gum has accumulated in solution, it is very difficult to remove without drastic treatment. But, on the other hand, by simple treatment of the fresh gasoline by our method before the harm has resulted, it is very easy to inhibit the formation of gum when the sample is evaporated or when it is allowed to stand.

In order to overcome these undesirable properties of cracked gasoline, we add to the gasoline a small quantity of certain organic compounds which we have discovered have the property of inhibiting formation of the undersirable gum. The nature of the inhibiting reaction, whereby these organic compounds function to prevent the formation of gum, is not clearly understood, but we characterize the compounds as inhibitors, anti-oxidants, negative catalysts, or simply anti-gum formers. Within the group of anti-gum formers we have found the following to be useful.

Ortho-aminophenol, meta-aminophenol, para-aminophenol, para-benzylaminophenol, beta-hydroxyethylaminophenol, para-dimethylaminophenol, 5-benzylamino-2-cresol, 2-amino-5-hydroxytoluene, 5-amino-2-hydroxytoluene, para-phenylenediamine, meta-phenylenediamine, orthophenylenediamine, and benzidene. In order to classify these compounds and not limit ourselves to those specified above, we prefer to distinguish them as aromatic amines and aminophenols and the derivatives of either class.

The quantity of anti-gum former required to accomplish our purpose varies from two to fifty milligrams per 100 cubic centimeters of the gasoline, depending on the nature of the gasoline to be treated, but we prefer to use approximately ten milligrams per 100 cubic centimeters. These may be added to the gasoline directly or it may be previously dissolved in a solvent such as acetone, benzol or ether, etc., and then added, in solution, to the gasoline. The latter method has been found to be advantageous where the material is difficultly dissolved.

In actual practice we prefer to treat a raw cracked gasoline direct from the still with approximately ten milligrams of ortho-aminophenol per 100 cubic centimeters. By this treatment we have found that the treated gasoline will deposit no appreciable gum when immediately evaporated or after aging for long periods.

We wish to point out that our process is equally applicable to any gum-forming gasoline, whether previously treated or not, as well as the raw cracked gasoline mentioned in our preferred form. In fact our process is valuable for treating fuels which have been acid treated or filtered through fuller's earth, and also far blended fuels; provided the treated fuel still contains constituents that form gum on storage.

Prior to our invention the methods used consisted in treating the cracked gasoline with polymerizing agents such as sulphuric acid, fuller's earth, etc., whereby the gum forming constituents were polymerized and removed as sludge. Such methods are costly because they require special equipment, large quantities of treating reagents and considerable time for the operations. Also the prior methods removed products which are valuable as fuel, especially for anti-knock purposes. Our process on the other hand is simple in that any tank or similar equipment available in the ordinary refinery may be used for adding the antigum former and the time required is of no important consideration; it is inexpensive, in that the quantity of treating material is very small since it enters into the reaction more in the nature of a catalyst than in quantitive proportions, and lastly no valuable constituents of the gasoline are lost as sludge.

This application is a division of our pending application No. 247,256, filed January 16, 1928.

We claim:

1. The method of preserving cracked hydrocarbon distillates of the character of gasoline which deteriorate and develop gums on storage, by incorporating therein a small proportion of an aromatic amine comprising one or more benzene rings sharing no carbon atoms in common, in quantity sufficient to retard the formation of gum.

2. The method of preserving a motor fuel comprising cracked gasoline hydrocarbons which tend to form gum and deteriorate in anti-knock qualities on storage, which comprises adding to said motor fuel a small proportion of a gum formation inhibiting aromatic amine comprising one or more benzene rings sharing no carbon atoms in common, sufficient to retard gum formation therein.

3. The method of treating a liquid motor fuel comprising highly unsaturated hydrocarbons of the type formed by cracking which normally tends to deteriorate and form gum on storage, which comprises incorporating therein an aromatic amine comprising one or more benzene rings sharing no carbon atoms in common, in an amount ranging from 2 mg. to 50 mg. per 100 cc. of distillate.

4. A motor fuel product consisting substantially entirely of cracked hydrocarbon distillates of the character of gasoline which tend to deteriorate and develop gums, said product containing a small proportion of an aromatic amine comprising one or more benzene rings sharing no carbon atoms in common having the amino groups substituted in the nucleus, such that its tendencies to deteriorate and develop gums are appreciably inhibited.

5. The method of refining a liquid motor fuel containing highly unsaturated hydrocarbons of the type formed by cracking and which tend to form gum on storage, which comprises adding thereto a small proportion of a gum formation inhibiting monocyclic aromatic amine, sufficient to retard said gum formation.

6. A motor fuel product comprising a hydrocarbon distillate containing unsaturated cracked hydrocarbons which tend to deteriorate and develop gums on storage, said product containing an added small proportion of an aromatic amine comprising one or more benzene rings sharing no carbon atoms in common such that its tendencies to deteriorate and develop gums are substantially inhibited.

7. The method of treating a motor fuel containing highly unsaturated hydrocarbon constituents of the type formed by cracking and which tend to develop gums on storage, comprising incorporating therein a small proportion of a monocyclic aromatic amine in an amount ranging from 2 mg. to 50 mg. per 100 cc. of motor fuel to retard said gum formation.

8. A motor fuel comprising cracked gasoline which normally tends to deteriorate and develop gums upon storage to which has been added a benzene compound containing at least one amino group attached to the benzene nucleus, in quantity sufficient to retard such deterioration and gum formation.

9. The method of preserving a liquid motor fuel comprising highly unsaturated hydrocarbons of the type formed by cracking and which tend to deteriorate and develop gums upon storage, which comprises adding to said motor fuel, in quantity sufficient to retard such deterioration and gum formation, a benzene compound containing at least one amino group attached to the nucleus of said benzene compound.

10. A liquid motor fuel product comprising highly unsaturated hydrocarbons of the type formed by cracking and which tend to deteriorate and develop gums on storage, said product containing a small proportion of an aromatic polyamine comprising one or more benzene rings sharing no carbon atoms in common having the amino groups substituted in the nucleus, such that its tendencies to deteriorate and develop gums are substantially inhibited.

11. The method of preserving a motor fuel containing unsaturated cracked hydrocarbons which normally tend to form gum on storage, which comprises adding to said motor fuel a monocyclic aromatic polyamine in quantity sufficient to retard said gum formation.

12. A motor fuel product comprising highly unsaturated hydrocarbons of the type formed by cracking and which tend to deteriorate and develop gums, said product containing a small proportion of a phenylenediamine in quantities sufficient to substantially inhibit said deterioration and development of gum.

13. A motor fuel product containing cracked hydrocarbon distillates of the character of gasoline which tend to deteriorate and develop gums, said product containing an added small proportion of a phenylenediamine, such that the tendencies to deteriorate and develop gums are substantially inhibited.

14. The method of stabilizing unsaturated cracked hydrocarbon motor fuels which tend to develop gums on storage, which comprises incorporating therein a small proportion of para phenylenediamine in quantity sufficient to substantially inhibit said gum formation.

15. A motor fuel product comprising cracked hydrocarbon distillates of the character of gasoline which tend to deteriorate and develop gums on storage, said product containing a small proportion of para-phenylenediamine such that its tendencies to deteriorate and develop gums are substantially inhibited.

16. A motor fuel product comprising cracked hydrocarbon distillates of the character of gasoline which tend to deteriorate and develop gums on storage, said product containing a small proportion of meta-phenylenediamine such that its tendencies to deteriorate and develop gums are substantially inhibited.

17. A motor fuel product comprising cracked hydrocarbon distillates of the character of gasoline which tend to deteriorate and develop gums on storage, said product containing a small proportion of benzidine such that its tendencies to deteriorate and develop gums are substantially inhibited.

HARRY T. BENNETT.
LE ROY G. STORY.

CERTIFICATE OF CORRECTION.

Patent No. 2,038,632.

April 28, 1936.

HARRY T. BENNETT, ET AL.

It is hereby certified that error appears in the printed specification of the above numbered patent requiring correction as follows: Page 1, first column, line 39, for "evaporaating" read evaporating; page 2, first column, line 16, for the word "far" read for; and second column, line 14, claim 6, for "aromate" read aromatic; and that the said Letters Patent should be read with these corrections therein that the same may conform to the record of the case in the Patent Office.

Signed and sealed this 26th day of May, A. D. 1936.

Leslie Frazer

Acting Commissioner of Patents.

corporating therein a small proportion of para phenylenediamine in quantity sufficient to substantially inhibit said gum formation.

15. A motor fuel product comprising cracked hydrocarbon distillates of the character of gasoline which tend to deteriorate and develop gums on storage, said product containing a small proportion of para-phenylenediamine such that its tendencies to deteriorate and develop gums are substantially inhibited.

16. A motor fuel product comprising cracked hydrocarbon distillates of the character of gasoline which tend to deteriorate and develop gums on storage, said product containing a small proportion of meta-phenylenediamine such that its tendencies to deteriorate and develop gums are substantially inhibited.

17. A motor fuel product comprising cracked hydrocarbon distillates of the character of gasoline which tend to deteriorate and develop gums on storage, said product containing a small proportion of benzidine such that its tendencies to deteriorate and develop gums are substantially inhibited.

HARRY T. BENNETT.
LE ROY G. STORY.

CERTIFICATE OF CORRECTION.

Patent No. 2,038,632.  April 28, 1936.

HARRY T. BENNETT, ET AL.

It is hereby certified that error appears in the printed specification of the above numbered patent requiring correction as follows: Page 1, first column, line 39, for "evaporaating" read evaporating; page 2, first column, line 16, for the word "far" read for; and second column, line 14, claim 6, for "aromate" read aromatic; and that the said Letters Patent should be read with these corrections therein that the same may conform to the record of the case in the Patent Office.

Signed and sealed this 26th day of May, A. D. 1936.

Leslie Frazer

Acting Commissioner of Patents.

CERTIFICATE OF CORRECTION.

Patent No. 2,038,632.

April 28, 1936.

HARRY T. BENNETT, ET AL.

It is hereby certified that error appears in the printed specification of the above numbered patent requiring correction as follows: Page 1, first column, line 39, for "evaporaating" read evaporating; page 2, first column, line 16, for the word "far" read for; and second column, line 14, claim 6, for "aromate" read aromatic; and that the said Letters Patent should be read with these corrections therein that the same may conform to the record of the case in the Patent Office.

Signed and sealed this 26th day of May, A. D. 1936.

Leslie Frazer

Acting Commissioner of Patents.